United States Patent [19]
Iida et al.

[11] Patent Number: 5,575,825
[45] Date of Patent: Nov. 19, 1996

[54] ABRASIVE

[75] Inventors: Katsuya Iida; Hideharu Mikami, both of Fujieda; Hiroaki Nishihara, Yokohama, all of Japan

[73] Assignee: Sumitomo Bakelite Company Limited, Tokyo, Japan

[21] Appl. No.: 305,838

[22] Filed: Sep. 14, 1994

[30] Foreign Application Priority Data

| Sep. 27, 1993 | [JP] | Japan | 5-239615 |
| Oct. 26, 1993 | [JP] | Japan | 5-267615 |
| Nov. 12, 1993 | [JP] | Japan | 5-282900 |

[51] Int. Cl.$^6$ .................................................. C09C 1/68
[52] U.S. Cl. ........................ 51/307; 51/293; 51/298; 51/303
[58] Field of Search ................. 51/293, 298, 303, 51/307; 521/40; 524/13, 15, 425, 445, 451, 594–5, 611; 528/129

[56] References Cited

U.S. PATENT DOCUMENTS

| 3,410,124 | 11/1968 | Suwa | 72/53 |
| 4,239,503 | 12/1980 | Harris et al. | 51/298 |
| 4,544,377 | 10/1985 | Schwen | 51/298 |
| 4,545,155 | 10/1985 | Nakata | 51/320 |
| 4,548,617 | 10/1985 | Miyatani et al. | 51/293 |
| 4,682,988 | 7/1987 | Narayanan et al. | 51/298 |
| 4,690,692 | 9/1987 | Hesse et al. | 51/298 |
| 4,832,706 | 5/1989 | Yates | 51/298 |
| 5,432,227 | 7/1995 | Fujimura | 524/425 |

FOREIGN PATENT DOCUMENTS

| 4101776 | 4/1992 | Japan . |

*Primary Examiner*—Deborah Jones
*Attorney, Agent, or Firm*—Browdy and Neimark

[57] ABSTRACT

An abrasive is produced by crushing a cured product of a phenol resin composition into particles, and washing with water and drying the particles. The phenol resin composition may comprise as principal constituents a phenol resin and an organic filler, or a phenol resin, an organic filler and an inorganic filler.

14 Claims, No Drawings

ABRASIVE

The present invention relates to an abrasive useful for removing burrs or flashes on moldings such as molded electronic parts, plastic products, etc., or for satin- or matte-finishing mold surfaces, and particularly to an abrasive suited for deflashing IC and LSI moldings.

Hitherto, hard materials such as alumina, silicon carbide, glass, etc., and soft materials such as nylon, polycarbonate, walnut shell flour, etc., or in some cases combinations of such materials, have been used as abrasives for after-treatments such as deflashing of molded articles.

The uses of molds and molded products are increasingly diversified and, in line with this, the suitability requirements for the abrasives used for such molds and moldings are becoming more and more strict. Especially, property requirements such as dimensional precision and surface roughness for the moldings relating to electrical parts are very strict, and there are many cases where the conflicting requirements of perfect removal of flash from the molding and no scratching on the other portions thereof must be met at the same time. To cope with such a situation, the need for high-performance abrasives is increasing.

Recently, as an answer to the above demand, there have been developed abrasives composed of cured thermosetting resins having intermediate properties between those of said hard materials and those of said soft materials. For instance, an abrasive made of a cured thermosetting resin such as an amino resin is disclosed in JP-A-4-101776. Cured phenol resin is excellent particularly in rigidity and heat resistance among thermosetting resins and has good properties as an abrasive. The abrasive composition may comprise a phenol resin alone or may have an organic and/or inorganic filler(s) in addition to a phenol resin, and generally a composition containing about 30 to 70% of said filler(s) is considered preferable in terms of its properties. However, an abrasive produced by crushing such a cured phenol resin composition has a strong offensive smell and many of its particles contain fine powders which electrostatically adhere to the abrasive-sized particles, and these factors combine to cause a drop in performance of the abrasive or the workability of the abrading operation.

Intensive studies have been pursued by the present inventors for the improvements of the abrasives composed of said cured thermosetting resins, especially cured phenol resins, and as a result an abrasive having a pertinent degree of hardness, excellent abrading performance and durability as well as good workability has been obtained.

The present invention provides an abrasive produced from a cured phenol resin composition by crushing the composition and washing with water and drying the crushed composition. The cured phenol resin composition is preferably a cured molding phenol resin composition comprising principally a phenol resin and an organic filler, or a phenol resin, an organic filler and an inorganic filler.

The phenol resins referred to in the present invention are the resins obtained by reacting phenols and aldehydes (usually formaldehyde) in the presence of an acid or alkaline catalyst, and they are crosslinked three-dimensionally and cured by heating or other means if necessary using a curing agent such as hexamethylene-tetramine. Phenol resins have the highest rigidity in all types of resins and are used as binder for hones, friction materials, refractories, shell molds, etc., because of their high bonding strength to reinforcements and fillers.

However, since phenol resins are condensation type thermosetting resins, the cured resins containing no additive tend to lack flexibility because of too strong a cohesive force, even if they are subjected to various kinds of modification treatments, for example, modification with drying oil, alkylbenzene, dicyclopentadiene or the like, and the abrasives produced therefrom would prove unsatisfactory in hardness and abrading qualities.

The present inventors have studied use of the cured phenol resin compositions, for example, cured phenol resin-based molding materials, containing an organic filler and/or an inorganic filler for the production of abrasives, and as a result have found that it is more appropriate and advantageous to use a phenol resin composition (e.g. molding material) comprising, as principal components, a phenol resin and an organic filler, or a phenol resin, an organic filler and an inorganic filler.

In the case of the phenol resin composition having an organic filler as a main component, usually the composition consists of 40–70 wt % of the phenol resin and 30–60 wt % of an organic filler, while the phenol resin composition having both organic and inorganic fillers as main components usually consists of 30–70 wt % of a phenol resin, 20–50 wt % of an organic filler and 10–40 wt % of an inorganic filler. The abrasives produced from these materials are excellent in rigidity and flexibility and have a suitable hardness, so that they show very high abrading performance and durability. Thus, by incorporating an organic filler in a phenol resin having strong rigidity, the resulting abrasive is improved in flexibility and provided with a pertinent hardness. When an inorganic filler is incorporated in addition to an organic filler, the rigidity of the abrasive is further enhanced.

The contents of these components in the composition are as specified above, but usually good results can be obtained when the content of an organic filler in the composition is 30–40 wt %, or when the content of an organic filler is 20–40 wt % and the content of an inorganic filler is 10–30 wt %. When the content of an organic filler is below the above-defined range, the product proves unsatisfactory in flexibility, and when said content exceeds the above range, the product deteriorates in rigidity. In the case where an inorganic filler is included in the composition; when its content is less than 10 wt % the effect of its blending is small, and when its content exceeds 30 wt % the product may prove short of flexibility.

The organic fillers usually used in the phenol resin-based molding materials include woodmeal, plywood meal, powders of cured thermosetting resins, ground pulp, cotton flocks and the like. These organic fillers are usable in the composition of the present invention. As inorganic fillers, there are generally used calcium carbonate, clay, talc, aluminum hydroxide, silica, glass powder, glass fiber and the like; however, in the case where the object to be abraded is a plastic molding such as a resin-sealed electric or electronic part, a soft type material such as calcium carbonate, clay, talc or aluminum hydroxide is preferably used. Use of a composition containing a hard inorganic filler such as silica, alumina, etc., in a high proportion should be avoided as it may damage the object article.

In the present invention, as the starting cured phenol resin materials, there can be used the sprues and runners produced in the mold during molding of the phenol resin composition, as well as the occasionally produced defective moldings, which have hitherto been discarded as wastes. This is quite remarkable for effective utilization of waste resources.

The ever increasing generation of waste materials inflicts baneful effects on the environment. This also reflects an inadequate use of limited resources. In these circumstances, the need for recycling of resources has become strong. The present invention is a positive answer to such a need, and it is further characterized by the excellent quality of the abrasive it provides.

An embodiment of a process for producing an abrasive according to the present invention is described below.

A phenol resin is used as a binder, and an organic filler such as woodmeal, or an organic filler and an inorganic filler are added thereto. If necessary, small quantities of auxiliaries such as lubricant and pigment are further added to better the workability, thus preparing a composition having a pertinent degree of hardness and resiliency which an abrasive is to have as essential properties. This composition is premixed, kneaded under heating by a kneader, then cooled and crushed to obtain a starting material (uncured phenol resin composition) for an abrasive.

Usually this material is first roughly crushed by a roll crusher or the like, then further crushed to a smaller particle size by a hammer mill or the like and then finely crushed by a free mill or the like. Part of this crushing step may be omitted or other pertinent crushing operation may be carried out by using a specific crushing means.

Then, said material is pressed into a mold and molded and cured by using a thermosetting resin injection molding machine, transfer molding machine or the like. It is imperative to use a mold of a simple configuration so as to allow molding at high efficiency, to give a high-density molding and to facilitate the ensuing crushing of the cured molding. The cured molding is taken out along with the sprues and runners, and crushed to a predetermined particle size by a suitable crusher to obtain abrasive particles.

The particle shape is preferably as close to spherical as possible for the betterment of abrasive properties. Such abrasive particles, in use, can produce an excellent surface condition of the abraded article and are also improved in durability.

For obtaining the spherical particles, there is usually used a jet crusher in which the particles are forced to impinge against one another. This crusher, however, is rather poor in crushing efficiency, so it is preferable to initially use an impact crusher to crush the cured composition to a certain predetermined range of particle size and then subject the thus crushed material to a short-time jet crusher treatment.

Further, for obtaining the abrasive of the present invention, the cured phenol resin composition is deodorized and cleared of fine powdery particles by water washing so as to maximize the abrading performance of the composition. The bad smell of the cured phenol resin composition is considered to be derived from the unreacted phenol, unreacted low-molecular weight substances, formaldehyde, hexamethylenetetramine decomposition products and the like. Removal of such smell does much for the improvement of working environment and workability of the composition. Removal of fine powders contributes to the improvement of abrading performance of the abrasive as well as the betterment of working environment and workability of the composition.

Water washing is carried out after crushing of the cured phenol resin composition. The crushed composition may be immediately washed with water, or it may be sieved to collect the particles in a predetermined size range before water washing. The latter is preferred for better working efficiency. Warm or hot water may be used for water washing. Drying after water washing is as important as water washing. Drying can be performed at room temperature or at a low temperature, but since low-temperature drying is time consuming, it is recommended to conduct drying under heating at 60°–180° C. for elevating both working efficiency and deodorizing effect.

The abrasive particle size is not subjected to restrictions so long as it is not too small (less than 10 μm) nor too large greater than several mm), but it is usually preferable that the abrasive particle size is in the range of 50 to 1,000 μm, more preferably 100 to 600 μm, for obtaining a maximum abrading efficiency.

The following examples further illustrate the present invention.

30 kg of each of the following abrasives were added to 100 kg of water and used for deflashing resin-sealed IC moldings with a wet abrader.

EXAMPLE 1 AND COMPARATIVE EXAMPLE 1

A molding material of a phenol resin composition obtained by blending 50 wt % of a phenol resin, 50 wt % of woodmeal as an organic filler and small quantities of a wax and a pigment, kneading the blend by heated rolls and crushing it was injection-molded in a mold (mold temp. 170° C.) having a 200×100×5 mm cavity under pressure of 350 kg/cm$^2$ for 5 minutes. The resultant cured molding, along with sprues and runners, were first crushed by an impact crusher, then further crushed to a smaller particle size by a jet crusher for a short period of time and sieved to collect a fraction with particle size in the range of 200–500 μm. The product was washed well with water and then dried under heating at 130° C. for 10 hours to obtain an abrasive.

As a comparative sample, a similar abrasive was produced by following the above procedures but omitting water washing and drying.

EXAMPLE 2 AND COMPARATIVE EXAMPLE 2

The procedures of Example 1 were repeated except for use of a molding material comprising 50 wt % of a phenol resin, 35 wt % of cellulose as an organic filler and 15 wt % of calcium carbonate as an inorganic filler to obtain an abrasive.

For the comparison's sake, there was produced a similar abrasive by following the above procedures but omitting water washing and drying.

The abrading performance of the resulting abrasives, surface condition of the abraded articles, smell and amount of fine powders scattered from the abrasives during abrasion were determined. The results are shown in Table 1.

COMPARATIVE EXAMPLES 3 AND 4

The similar comparative tests were conducted on nylon particles (particle size: 200–500 μm) (Comparative Example 3) and glass beads (particle size: 200–500 μm) (Comparative Example 4) selected as typical conventional abrasives. The results are shown in Table 1.

TABLE 1

| | Abrading performance | Surface condition of abraded article | Smell | Amount of fine powders scattered |
|---|---|---|---|---|
| Example 1 | ⊚ | Good | Slight | Little |
| Comp. | ○ | Good | Strong | Much |

TABLE 1-continued

| | Abrading performance | Surface condition of abraded article | Smell | Amount of fine powders scattered |
|---|---|---|---|---|
| Example 1 | | | | |
| Example 2 | ⊙ | Good | Slight | Little |
| Comp. Example 2 | o | Good | Strong | Much |
| Comp. Example 3 | x | Bad | Slight | Little |
| Comp. Example 4 | ⊙ | Bad | None | Little |

Abrading performance ⊙: No problem
o: Flashes remained slightly
x: Many flashes were left As is apparent from the above Examples, the abrasive of the present invention has a desirable degree of hardness and excellent abrading performance and durability, gives out little offensive smell and little fine powders scattered in use thereof, shows excellent workability and can contribute to the improvement of working environment.

What is claimed is:

1. An abrasive produced by crushing a cured product of a phenol resin composition into particles, and washing with water and drying the particles, wherein the phenol resin composition comprises as principal constituents a phenol resin and an organic filler selected from the group consisting of woodmeal, plywood meal, powder of cured thermosetting resins, powdered pulp and cotton flocks, and wherein the phenol resin composition comprises 40–70% of a phenol resin and 30–60 wt % of said organic filler.

2. An abrasive according to claim 1, wherein the cured product of the phenol resin composition is a mass of wastes such as sprues, runners and defective moldings which are produced during molding of the phenol resin composition.

3. An abrasive according to claim 1, wherein the particle size of a major amount of the abrasive is 50–1,000 μm.

4. An abrasive according to claim 1, wherein drying of the particles has been carried out at 60°–180° C.

5. An abrasive according to claim 1, further comprising an amount sufficient of water to provide a water slurry of said particles.

6. An abrasive produced by crushing a cured product of a phenol resin composition into particles, and washing with water and drying the particles, wherein the phenol resin composition comprises as principal constituents a phenol resin, an organic filler selected from the group consisting of woodmeal, plywood meal, powder of cured thermosetting resins, powdered pulp and cotton flocks, and an inorganic filler which is at least one substance selected from the group consisting of calcium carbonate, aluminum hydroxide, talc and clay, and wherein the phenol resin composition comprises 30–70 wt % of a phenol resin, 20–50 wt % of said organic filler and 10–40 wt % of said inorganic filler.

7. An abrasive according to claim 6, wherein the cured product of the phenol resin composition is a mass of wastes such as sprues, runners and defective molding which are produced during molding of the phenol resin composition.

8. An abrasive according to claim 6, wherein the particle size of a major amount of the abrasive is 50–1,000 μm.

9. An abrasive according to claim 6, wherein drying of the particles has been carried out at 60°–80° C.

10. An abrasive according to claim 5, further comprising an amount sufficient of water to provide a water slurry of said particles.

11. A process of making abrasive particles formed of a phenolic resin composition, said method comprising:

providing a cured body of a phenolic resin composition comprising as principal constituents a phenolic resin and an organic filler selected from the group consisting of woodmeal, plywood meal, powder of cured thermoset resins, powdered pulp and cotton flock, and optionally at least one inorganic filler selected from the group consisting of calcium carbonate, aluminum hydroxide, talc and clay, said phenolic resin composition comprising 40–70 wt % of phenolic resin and 30–60 wt % of said organic filler when said inorganic filler is not present, or 30–70 wt % of phenolic resin, 20–50 wt % of said organic filler and 10–40 wt % of said inorganic filler;

crushing said cured phenolic resin composition into particles;

washing said particles with water to wash away fine powdery particles and to deodorize said cured phenolic resin particles; and drying said washed particles.

12. A process according to claim 11 wherein said drying is carried out by heating at 60°–180° C.

13. A process according to claim 11 further comprising sieving said particles after crushing and before washing with water to obtain particles of a predetermined size.

14. A product obtained by the process of claim 12.

* * * * *